(12) United States Patent
Song et al.

(10) Patent No.: US 11,784,574 B2
(45) Date of Patent: Oct. 10, 2023

(54) AUTOMOTIVE POWER CONVERTER

(71) Applicant: Ford Global Technologies, LLC, Dearborn, MI (US)

(72) Inventors: Yantao Song, Northville, MI (US); Baoming Ge, Okemos, MI (US); Lihua Chen, Farmington Hills, MI (US); Serdar Hakki Yonak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/537,629

(22) Filed: Nov. 30, 2021

(65) Prior Publication Data
US 2023/0170811 A1    Jun. 1, 2023

(51) Int. Cl.
| | | |
|---|---|---|
| *H02M 3/335* | (2006.01) |
| *H02M 7/219* | (2006.01) |
| *H02M 7/5387* | (2007.01) |
| *H02J 7/34* | (2006.01) |
| *B60L 50/60* | (2019.01) |
| *B60R 16/033* | (2006.01) |
| *B60L 53/53* | (2019.01) |
| *B60L 53/24* | (2019.01) |
| *B60L 50/40* | (2019.01) |

(52) U.S. Cl.
CPC ......... *H02M 3/33573* (2021.05); *B60L 50/40* (2019.02); *B60L 50/60* (2019.02); *B60L 53/24* (2019.02); *B60L 53/53* (2019.02); *B60R 16/033* (2013.01); *H02J 7/342* (2020.01); *H02M 3/33576* (2013.01); *H02M 7/219* (2013.01); *H02M 7/5387* (2013.01); *B60L 2210/30* (2013.01); *B60L 2210/40* (2013.01); *H02J 2207/20* (2020.01)

(58) Field of Classification Search
CPC .................................................. H02M 3/33573
See application file for complete search history.

(56) References Cited

U.S. PATENT DOCUMENTS

| | | | | |
|---|---|---|---|---|
| 8,587,252 B2 * | 11/2013 | Reggio | ............. | H02M 3/33573 |
| | | | | 320/104 |
| 9,340,114 B2 | 5/2016 | Ferrel et al. | | |
| 11,021,069 B1 * | 6/2021 | Elshaer | .................. | B60L 50/60 |
| 2003/0198064 A1 * | 10/2003 | Zhu | .................... | H02M 3/33576 |
| | | | | 363/21.01 |
| 2006/0050537 A1 * | 3/2006 | Zeng | .................. | H02M 3/33569 |
| | | | | 363/16 |

(Continued)

FOREIGN PATENT DOCUMENTS

| | | |
|---|---|---|
| CN | 103138584 A | 6/2013 |
| EP | 2388902 A1 | 11/2011 |

*Primary Examiner* — Adi Amrany
*Assistant Examiner* — Esayas G Yeshaw
(74) *Attorney, Agent, or Firm* — David B. Kelley; Brooks Kushman, P.C.

(57) ABSTRACT

A power system for a vehicle includes a traction battery having an output voltage, a transformer including a coil, and a power converter including a plurality of capacitors and a plurality of switches arranged such that when a first subset of the switches are ON, two of the capacitors are in parallel, an AC voltage across the coil is in a positive half cycle, and a voltage across each of the two of the capacitors is half the output voltage.

11 Claims, 5 Drawing Sheets

(56) References Cited

U.S. PATENT DOCUMENTS

| | | | |
|---|---|---|---|
| 2012/0235626 A1* | 9/2012 | Oh | H02M 3/3353 |
| | | | 320/103 |
| 2014/0111016 A1* | 4/2014 | He | H02M 7/487 |
| | | | 307/82 |
| 2015/0054337 A1 | 2/2015 | Ogale | |
| 2018/0194236 A1* | 7/2018 | Elshaer | B60L 53/12 |
| 2019/0143822 A1* | 5/2019 | Malek | H02M 3/33584 |
| | | | 320/109 |
| 2020/0403516 A1* | 12/2020 | Kawamura | H02M 1/08 |
| 2021/0408889 A1* | 12/2021 | Zhu | B60L 15/007 |

\* cited by examiner

AUTOMOTIVE POWER CONVERTER

TECHNICAL FIELD

This disclosure relates to power systems for automotive vehicles.

BACKGROUND

Electrified vehicles may include traction and auxiliary batteries. The traction batteries may be used to power electric machines for propulsion. The auxiliary batteries may be used to power entertainment systems, interior lighting systems, etc. The traction and auxiliary batteries may be arranged such that one can charge the other.

SUMMARY

A power system for a vehicle includes a traction battery having an output voltage, a transformer including a coil, and a power converter, electrically connected between the traction battery and transformer, including a plurality of capacitors and a plurality of switches arranged such that when a first subset of the switches are ON, two of the capacitors are in parallel, an AC voltage across the coil is in a positive half cycle, and a voltage across each of the two of the capacitors is half the output voltage, and when a second subset of the switches are ON, one of the two capacitors and another of the capacitors are in parallel, the AC voltage across the coil is in a negative half cycle, and a voltage across each of the one of the of two capacitors and the another of the capacitors is half the output voltage.

A method of operating a power system including a traction battery, a transformer, and a power converter, includes commanding a first subset of a plurality of switches of the power converter ON such that a first subset of a plurality of capacitors of the power converter are in parallel, an AC voltage across a coil of the transformer is in a positive half cycle, and a voltage across each of the first subset of the plurality of capacitors is half an output voltage of the traction battery, and commanding a second subset of the plurality of switches of the power converter ON such that at least one of the first subset of the plurality of capacitors and at least another of the plurality of capacitors are in parallel, the AC voltage across the coil is in a negative half cycle, and a voltage across the at least one of the first subset of the plurality of capacitors and the at least another of the plurality of capacitors is half the output voltage.

A vehicle has a power system including a traction battery, a transformer, a DC/AC power converter electrically connected between the traction battery and transformer, a load, and an AC/DC power converter electrically connected between the transformer and load. The vehicle also has a controller that generates commands for a first subset of a plurality of switches of the DC/AC power converter such that a first subset of a plurality of capacitors of the DC/AC power converter are in parallel, an AC voltage across a coil of the transformer is in a positive half cycle, and a voltage across each of the first subset of the plurality of capacitors is half an output voltage of the traction battery. The controller also generates commands for a second subset of the plurality of switches of the power converter such that at least one of the first subset of the plurality of capacitors and at least another of the plurality of capacitors are in parallel, the AC voltage across the coil is in a negative half cycle, and a voltage across the at least one of the first subset of the plurality of capacitors and the at least another of the plurality of capacitors is half the output voltage.

DETAILED DESCRIPTION

Figure 1:
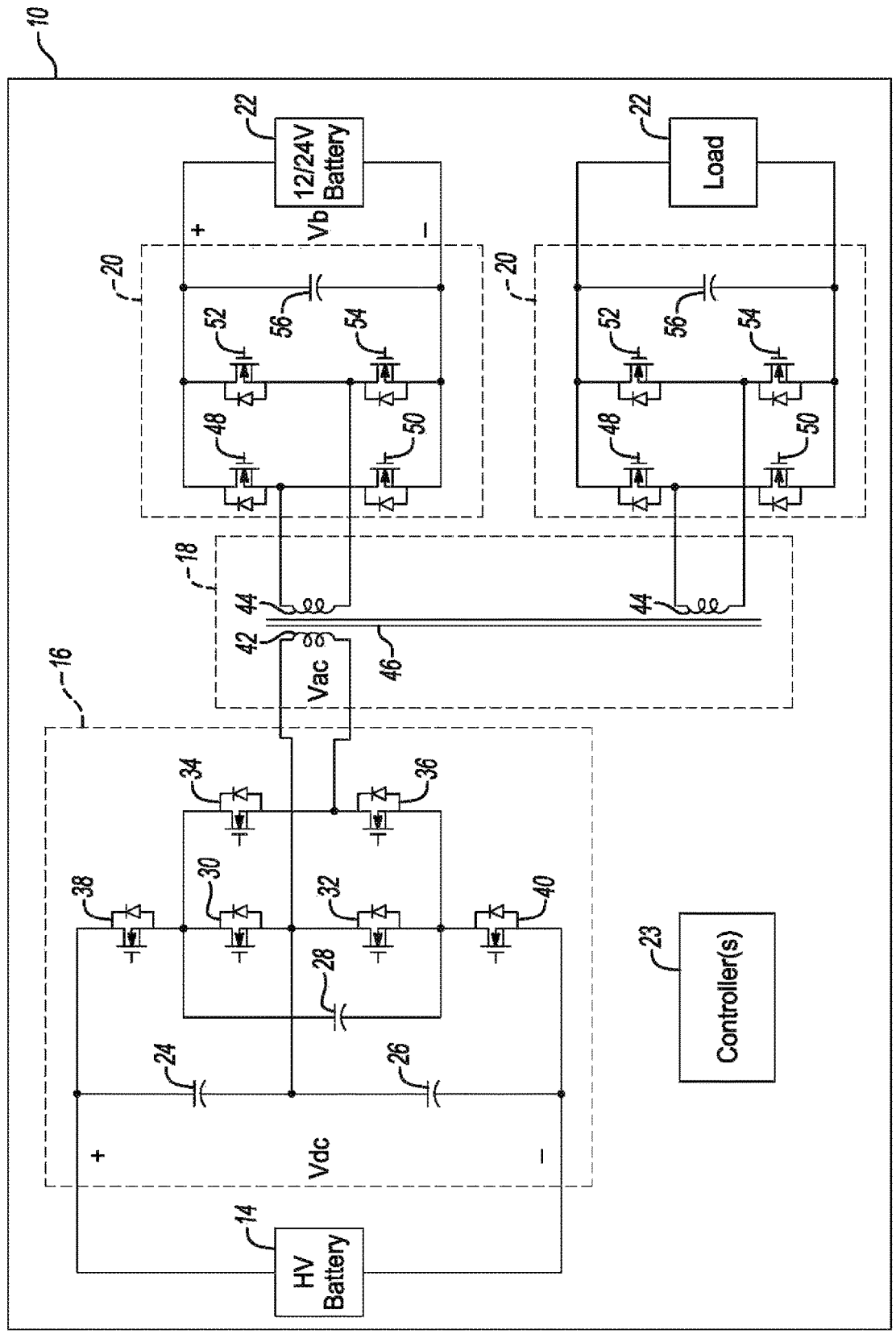
FIG. 1 is a block diagram of a power system for an automotive vehicle.
Figure 2:
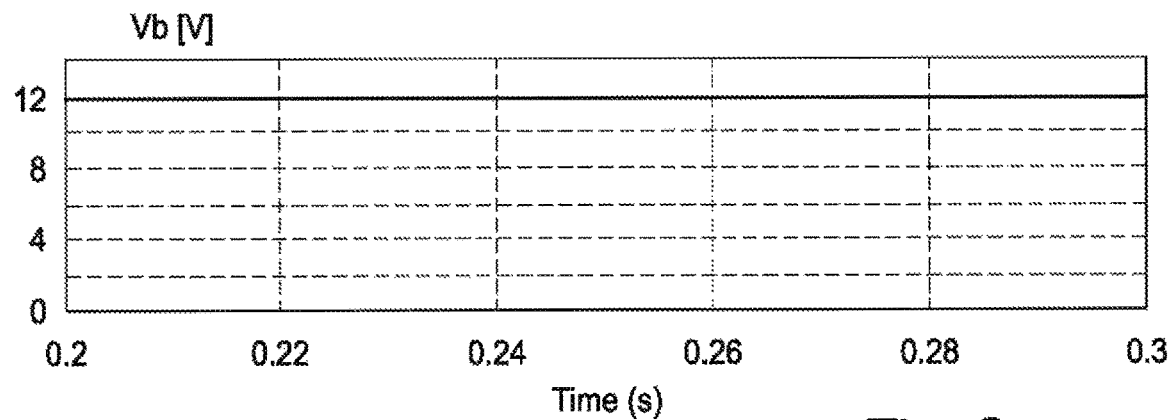
FIG. 2 is a simulation plot of 12V battery voltage.
Figure 3:
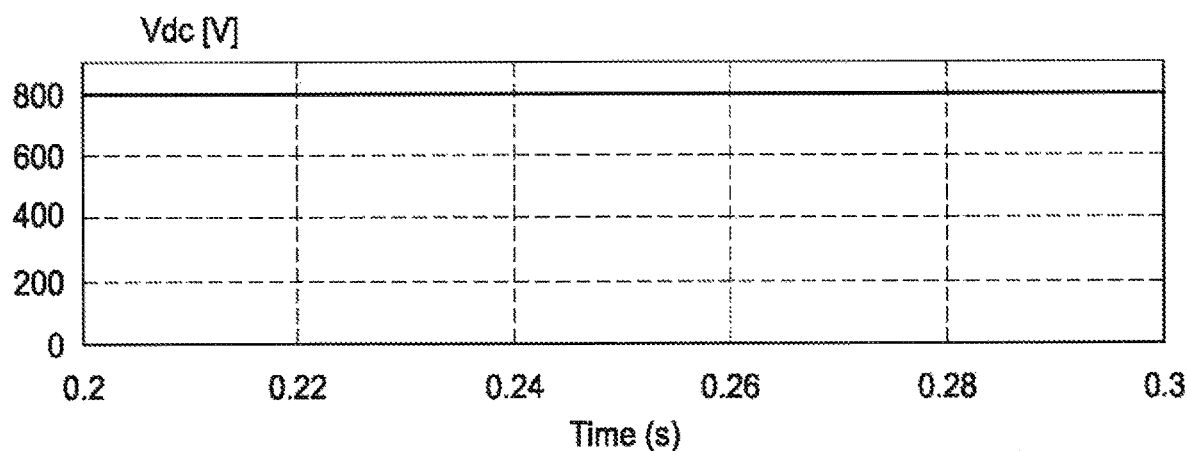
FIG. 3 is a simulation plot of traction battery or DC-link voltage.
Figure 4:
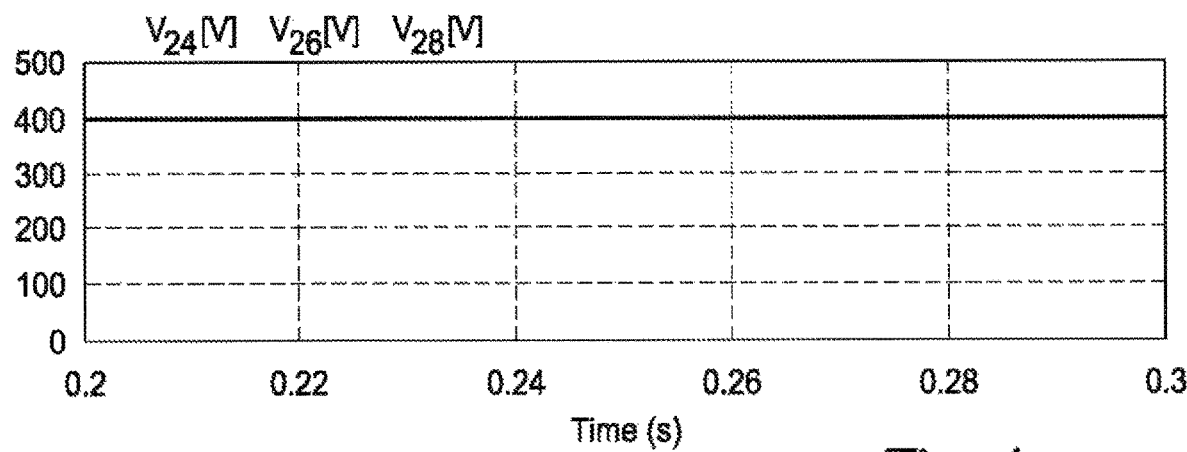
FIG. 4 is a simulation plot of link capacitor voltages.
Figure 5:
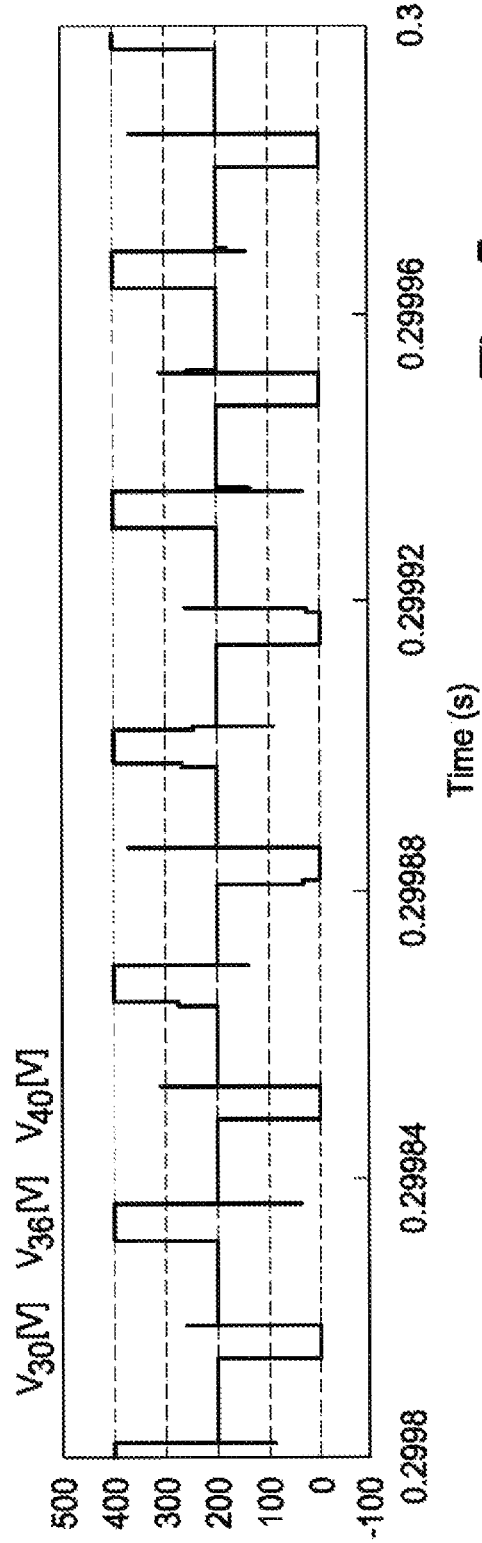
FIGS. 5 and 6 are simulation plots of semiconductor switch voltages.
Figure 6:
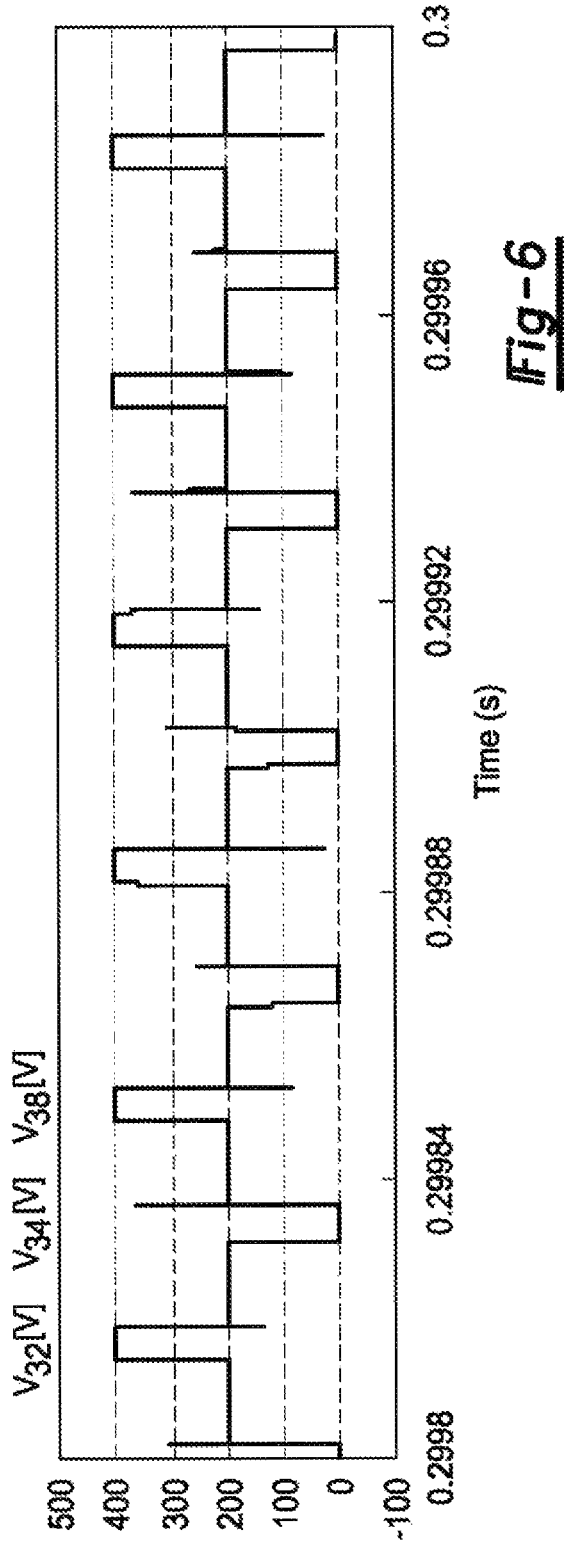
Figure 7:
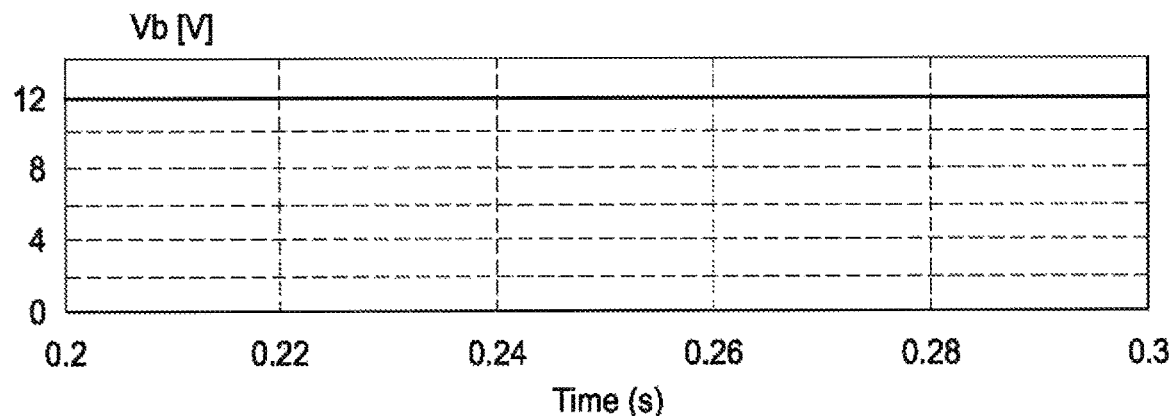
FIG. 7 is a simulation plot of 12V battery voltage.
Figure 8:
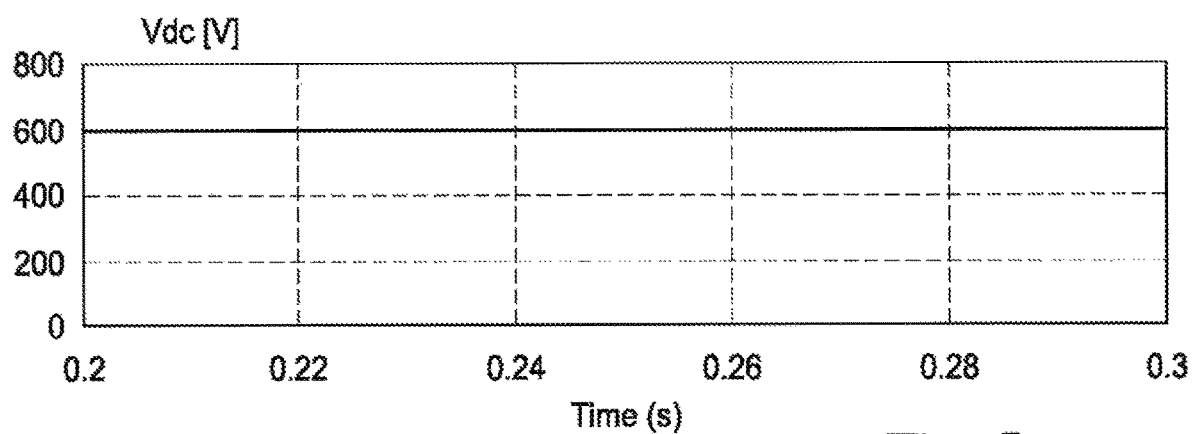
FIG. 8 is a simulation plot of traction battery or DC-link voltage.
Figure 9:
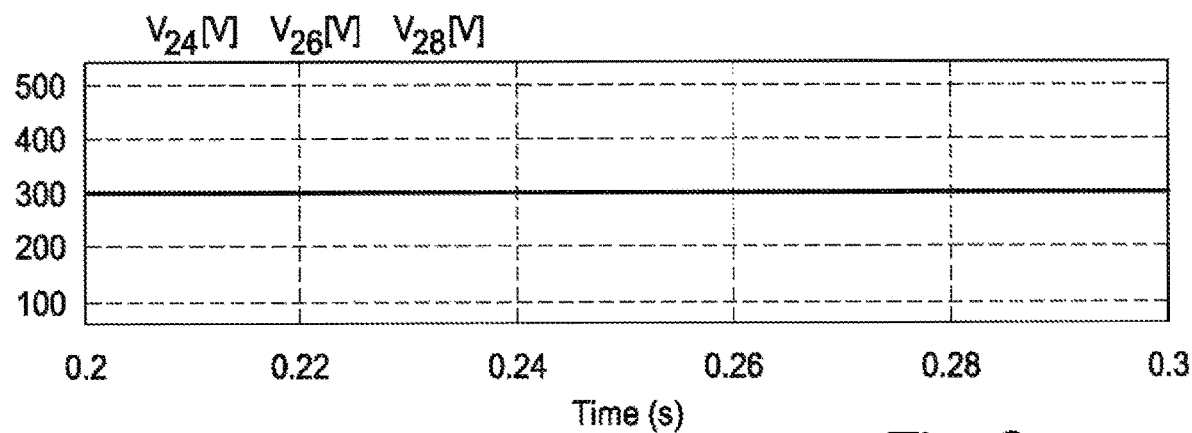
FIG. 9 is a simulation plot of link capacitor voltages.
Figure 10:
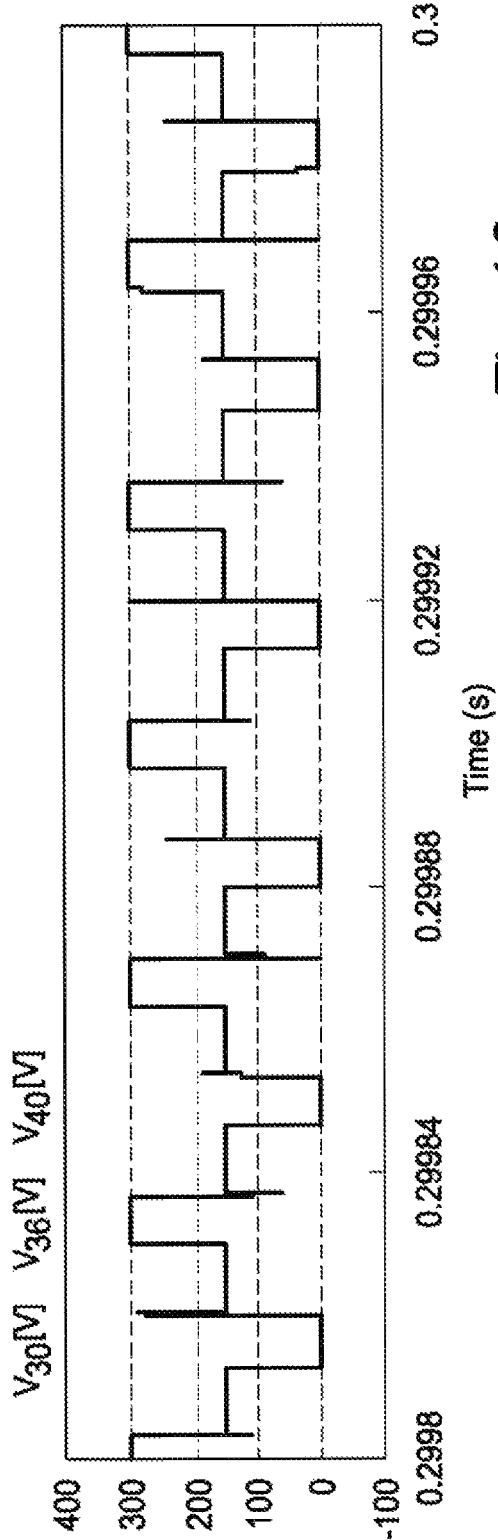
FIGS. 10 and 11 are simulation plots of semiconductor switch voltages.
Figure 11:
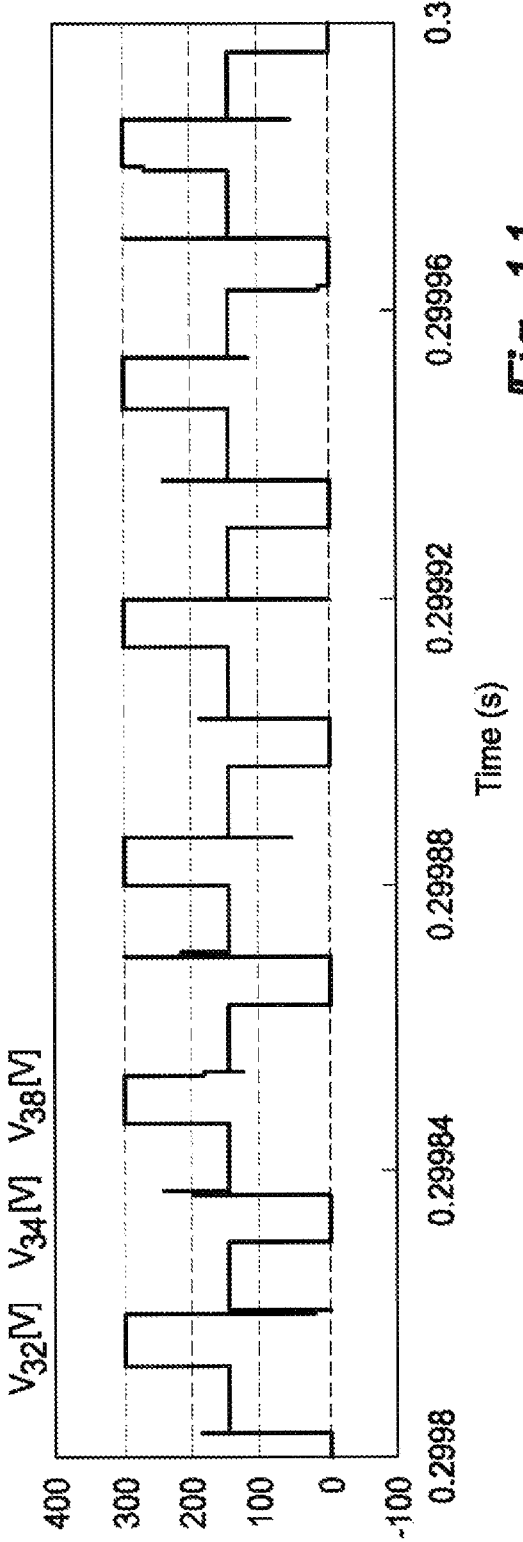

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In a typical DC-DC converter of an electric vehicle, the on-board auxiliary power module transfers energy from the high voltage battery to the low voltage battery for low voltage electronic loads. In this arrangement, semiconductor switches are in series-connected pairs that define legs that are in parallel with each other, and could be metal-oxide-semiconductor field-effect transistors, insulated-gate bipolar transistors, or other active semiconductor devices. The voltage stress on these semiconductor devices is dictated by the DC-link voltage, which is the voltage on the DC-link capacitor that is in parallel with the legs. In applications in which the DC-link voltage is less than 450V, semiconductor devices with a voltage rating less than 650V can be selected. If the DC-link voltage is greater than 450V, semiconductor devices with a voltage rating greater than 650V should be selected. Common issues with high voltage semiconductor devices include limited choice, higher expense, and possible lower performance (e.g., voltage drop, reverse recovery loss, leakage current, reduced switching speed, etc.). For some applications in which metal-oxide-semiconductor field-effect transistors must be used to increase converter switching frequency and reduce converter size, it can be challenging to source such with voltage ratings greater than 650V.

To meet the increasing demands of high-driving-capability electric vehicles, the power capability of traction inverters and motors is increasing. This increasing power demand challenges the design of inverter/motor and high voltage cable systems. One option of increasing the power capability of electric vehicle driving systems is to increase the voltage of the traction battery. Some manufacturers have increased traction battery voltages to 500V, 600V, and even 800V. The increased battery voltage increases the power capability of the traction inverter/motor without increasing the current rating of the inverter/motor and high voltage cable system. Higher battery voltages, however, correspond to higher DC-link voltages, and increase the voltage stress on the semiconductor devices—necessitating the use of the same with voltage ratings that exceed 650V. For example, if the battery voltage is 800V, the voltage stress on the semiconductor devices is 800V, and so semiconductor devices with a voltage rating of 1200V should be used. For auxiliary power module applications, metal-oxide-semiconductor field-effect transistors are often selected to enable high switching frequency operation. Therefore, passive components size can be reduced and auxiliary power module package size and expense can be optimized. As the voltage rating increases to more than 650V, the conduction resistance of metal-oxide-semiconductor field-effect transistor devices and expense dramatically increases, resulting in higher auxiliary power module expense and lower auxiliary power module efficiency.

Here, a three-level DC-DC converter that reduces the voltage stress on power switches is proposed. With reference to FIG. 1, a power system 10 for a vehicle 12 includes a traction battery 14, a DC/AC converter 16, a transformer 18, one or more AC/DC converters 20, one or more loads 22 (e.g., an auxiliary battery, etc.), and one or more controllers 23. The DC/AC converter 16 is electrically connected between the traction battery 14 and transformer 18. The transformer 18 is electrically connected between the DC/AC converter 16 and AC/DC converters 20. And the AC/DC converters 20 are electrically connected between the transformer 18 and the loads 22. The traction battery 14 may thus provide energy to the loads 22 via the DC/AC converter 16, transformer 18, and AC/DC converters 20.

The DC/AC converter 16 includes link capacitors 24, 26, 28 and semiconductor switches 30, 32, 34, 36, 38, 40. The link capacitors 24, 26 are electrically connected in series, the semiconductor switches 30, 32, 38, 40 are electrically connected in series, and the semiconductor switches 34, 36 are electrically connected in series. The link capacitor 28, the series-connected semiconductor switches 30, 32, and the series connected semiconductor switches 34, 36 are electrically connected in parallel. The series-connected link capacitors 24, 26 and the series-connected switches 30, 32, 38, 40 are electrically connected in parallel with the traction battery 14.

The transformer 18 includes, in this example, coils 42, 44, and core 46 such that the coils 42, 44 can be electromagnetically coupled. Other arrangements are also possible.

The AD/DC converters 20 each include semiconductor switches 48, 50, 52, 54, (e.g., metal-oxide-semiconductor field-effect transistors, insulated-gate bipolar transistors, other active semiconductor devices, etc.) and capacitor 56. The semiconductor switches 48, 50 are electrically connected in series and the semiconductor switches 52, 54 are electrically connected in series. The series-connected semiconductor switches 48, 50, the series-connected switches 52, 54, and the capacitor 55 are electrically connected in parallel with the corresponding load 22.

One terminal (upper terminal) of the coil 42 is electrically connected between the series-connected link capacitors 24, 26 and the series connected switches 30, 32. The other terminal (lower terminal) of the coil 42 is electrically connected between the series-connected switches 34, 36. For each of the AD/DC converters 20, one terminal of the coil 44 is electrically connected between the series-connected semiconductor switches 48, 50. The other terminal of the coil 44 is electrically connected between the series-connected semiconductor switches 52, 54.

This arrangement reduces the voltage stress on the semiconductor switches 30 through 40 to half of the DC-link voltage, which is the voltage collectively across the series-connected link capacitors 24, 26. When the semiconductor switches 30, 36, and 40 are ON, the link capacitors 26 and 28 are in parallel, and the AC voltage across the coil 42 is in the positive half cycle (positive on the upper terminal of the coil 42). When the semiconductor switches 32, 34, and 38 are ON, the link capacitors 24, 28 are in parallel, and the AC voltage across the coil 42 is in the negative half cycle (positive on the lower terminal of the coil 42). In this circuit, the voltages across each of the link capacitors 24, 26, 28 are the same and equal to half the DC-link voltage. Correspondingly, the voltage stress on each of the semiconductor switches 30 through 40 is the voltage across each of the link capacitors 24, 26, 28 and equal to half the DC-link voltage. Therefore, semiconductor devices with lower voltage ratings can be used for the semiconductor switches 30 through 40, such as metal-oxide-semiconductor field-effect transistors, insulated-gate bipolar transistors, or other active semiconductor devices with lower voltage ratings.

The controllers 23 are in communication with and/or control the traction battery 14, DC/AC converter 16, transformer 18, converters 20, and one or more loads 22. As such, the controllers 23 may issue commands to the semiconductor switches 30, 32, 34, 36, 38, 40 to achieve the DC/AC conversion conditions described above. Likewise, the controllers 23 may issue commands to the semiconductor switches 48, 50, 52, 54 to achieve AC/DC conversion conditions.

If the voltage of the traction battery 14 is 800V, the voltage across each of the link capacitors 24, 26, 28 is 400V, the voltage stress on each of the semiconductor switches 30 through 40 is 400V, and therefore 600V metal-oxide-semiconductor field-effect transistors, for example, could be used for the semiconductor switches 30 through 40. In contrast, 1200V semiconductor devices would need to be used if the DC/AC converter 16 had a standard topology.

With reference to FIGS. 1, 2, 3, 4, 5, and 6, with a 300A charging current, the traction battery 14 is operating at 800V and the auxiliary battery 22 is operating at 12V. As apparent from the simulation, the voltage across the switches 30 through 40 does not exceed 400V.

With reference to FIGS. 1, 7, 8, 9, 10, and 116, with a 300A charging current, the traction battery 14 is operating at 600V and the auxiliary battery 22 is operating at 12V. As apparent from the simulation, the voltage across the switches 30 through 40 does not exceed 300V.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The proposed topology, for example, can also be applied to on-board generators to reduce the voltage stress on power semiconductor devices, etc.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power system for a vehicle comprising:
   a traction battery having an output voltage;
   a transformer including a coil having a terminal; and
   a power converter, electrically connected between the traction battery and transformer, including a plurality of capacitors and a plurality of switches arranged such that
   four of the switches are in series,
   first and second of the capacitors are in series,
   the terminal is directly connected between the first and second of the capacitors and directly connected between two upper of the four of the switches and two lower of the four of the switches,
   when a first subset of the switches are ON, two of the capacitors are in parallel, an AC voltage across the coil is in a positive half cycle, and a voltage across each of the two of the capacitors is half the output voltage, and
   when a second subset of the switches are ON, one of the two capacitors and another of the capacitors are in parallel, the AC voltage across the coil is in a negative half cycle, and a voltage across each of the one of the of two capacitors and the another of the capacitors is half the output voltage.

2. The power system of claim 1 an auxiliary battery and another power converter electrically connected between the transformer and auxiliary battery.

3. The power system of claim 2, wherein the power converter is a DC/AC power converter and the another power converter is an AC/DC power converter.

4. The power system of claim 1 further comprising a controller programmed to generate commands for the switches.

5. The power system of claim 1, wherein the switches are transistors.

6. A vehicle comprising:
   a power system including a traction battery, a transformer including a coil having a terminal, a DC/AC power converter electrically connected between the traction battery and transformer, a load, and an AC/DC power converter electrically connected between the transformer and load; and
   a controller programmed to generate commands for a first subset of a plurality of switches of the DC/AC power converter such that a first subset of a plurality of capacitors of the DC/AC power converter are in parallel, an AC voltage across a coil of the transformer is in a positive half cycle, and a voltage across each of the first subset of the plurality of capacitors is half an output voltage of the traction battery, and to generate commands for a second subset of the plurality of switches of the DC/AC power converter such that at least one of the first subset of the plurality of capacitors and at least another of the plurality of capacitors are in parallel, the AC voltage across the coil is in a negative half cycle, and a voltage across the at least one of the first subset of the plurality of capacitors and the at least another of the plurality of capacitors is half the output voltage, wherein four of the switches are in series, two of the capacitors are in series, and the terminal is directly connected between the two of the capacitors and directly connected between two upper of the four of the switches and two lower of the four of the switches.

7. The vehicle of claim 6, wherein the first subset of the plurality of switches is three switches and the second subset of the plurality of switches is three switches such that the DC/AC power converter has no more than six switches.

8. The vehicle of claim 6, wherein the first subset of the plurality of capacitors is two capacitors and the at least one of the first subset of the plurality of capacitors and the at least another of the plurality of capacitors is two capacitors such that the DC/AC power converter has no more than three capacitors.

9. The vehicle of claim 6, wherein the controller is further programmed to generate commands for switches of the AC/DC power converter to transfer power from the traction battery to the load.

10. The vehicle of claim 6, wherein the switches are transistors.

11. The vehicle of claim 6, wherein the load is an auxiliary battery.

* * * * *